(12) United States Patent
Gataric et al.

(10) Patent No.: US 11,114,932 B1
(45) Date of Patent: Sep. 7, 2021

(54) METHOD AND APPARATUS FOR REDUCTION OF RIPPLE CURRENT

(71) Applicant: GE AVIATION SYSTEMS LLC, Grand Rapids, MI (US)

(72) Inventors: Slobodan Gataric, Dayton, OH (US); Predrag Hadzibabic, Dix Hills, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 16/904,684

(22) Filed: Jun. 18, 2020

(51) Int. Cl.
H02M 1/14 (2006.01)

(52) U.S. Cl.
CPC .................. H02M 1/143 (2013.01)

(58) Field of Classification Search
CPC ........ H01F 27/33; H01F 27/34; H01F 27/341; H01F 27/343; H01F 27/345; H02M 1/12; H02M 1/123; H02M 1/126; H02M 1/14; H02M 1/143; H02M 1/15
See application file for complete search history.

(56) References Cited

U.S. PATENT DOCUMENTS

| | | | |
|---|---|---|---|
| 7,016,205 B2 | 3/2006 | Steigerwald et al. | |
| 7,576,500 B2 | 8/2009 | Patel et al. | |
| 7,880,577 B1 * | 2/2011 | Glaser | H02M 7/103 336/184 |
| 7,929,325 B2 | 4/2011 | de Rooij et al. | |
| 8,233,258 B2 | 7/2012 | Wei et al. | |
| 8,358,033 B2 | 1/2013 | Wagoner | |
| 8,536,843 B2 | 9/2013 | Takahashi | |
| 8,576,598 B2 | 11/2013 | Wagoner et al. | |
| 8,975,884 B2 | 3/2015 | Hulsey et al. | |
| 10,044,279 B2 | 8/2018 | Guepratte et al. | |
| 10,312,881 B2 * | 6/2019 | Shudarek | H03H 7/0138 |
| 2008/0001695 A1 | 1/2008 | Riggio et al. | |
| 2008/0224812 A1 * | 9/2008 | Chandrasekaran | H02M 7/217 336/212 |
| 2016/0017297 A1 | 6/2016 | Mu et al. | |
| 2018/0323720 A1 * | 11/2018 | Njiende | H01F 27/2823 |

* cited by examiner

Primary Examiner — Gary L Laxton
(74) Attorney, Agent, or Firm — McGarry Bair PC (57) ABSTRACT

A ripple current reduction circuit is disclosed. The circuit includes a set of first coupled inductors, each comprising a primary winding configured to receive at a first end a respective phase voltage, and a secondary winding. The circuit also includes a set of second coupled inductors and a set of first capacitors, each first capacitor having an upstream end and a downstream end, wherein the set of first capacitors are coupled together at the downstream end to define a first node. The circuit further includes a set of auxiliary circuits each corresponding to a respective phase voltage, and coupled between the second end of the primary winding of a respective first inductor and the first node, wherein each auxiliary circuit comprises a respective second coupled inductor, a respective first capacitor, and the secondary winding of a respective first coupled inductor coupled in series.

20 Claims, 8 Drawing Sheets

FIG. 8 ly skilled in the art, is set forth in the specification, which makes reference to the appended figures, in which:

METHOD AND APPARATUS FOR REDUCTION OF RIPPLE CURRENT

TECHNICAL FIELD

This invention relates to generally to ripple current reduction techniques, and more specifically to a circuit for the reduction of a ripple current.

BACKGROUND

The present disclosure relates to ripple-current reduction techniques and, more particularly, relates to the application of such techniques to power electronic circuits.

High-speed switching devices have enabled increased switching frequencies for voltage-source pulse width modulated (PWM) inverters and DC-DC converters, leading to improved operating characteristics. High-speed switching techniques, however, present some drawbacks, as a consequence of a faster rate-of-change in the voltage associated with the high-speed switching.

Due to the switching frequencies of solid-state switches used in the operation of power electronic circuits, a desirable low frequency current and an undesirable high frequency ripple current will flow in the circuit. To reduce the high-frequency ripple currents, some conventional systems employ various chokes and filters. Such passive filters, are commonly referred to as "LC filters" because they typically employ an inductor (L) and a capacitor (C) coupled to ground in the input AC line to attenuate the ripple current. For example, a low-pass LC filter (e.g., an inductor coupled to a capacitor) is typically used to allow the flow of low frequency current while reducing high frequency ripple current.

A problem associated with such circuitry is that ripple currents in the filter capacitor induce heating due to conductor and dielectric losses. This undesired heating of the filter capacitor reduces the life of the capacitor. It is desirable to reduce the ripple current into the capacitor to decrease the heating and increase the life expectancy of the capacitor. It would be desirable therefore, to have a ripple current reduction circuit and method which provides improved performance and reduction of ripple currents over conventional techniques.

The foregoing and still further objects and advantages of the present disclosure will be more apparent from the following detailed explanation of the preferred aspects of the disclosure in connection with the accompanying drawings.

BRIEF DESCRIPTION

In one aspect, the present disclosure relates to an AC ripple current reduction circuit couplable to a polyphase AC voltage source having a neutral line. The circuit includes a set of first coupled inductors inductively coupled on a first common core, each first coupled inductor comprising a primary winding configured to receive at a first end a respective phase voltage from the polyphase AC voltage source, and a secondary winding. The circuit also includes a set of second coupled inductors being inductively coupled on a second common core and a set of a set of first capacitors. Additionally, a set of auxiliary circuits is included, each auxiliary circuit corresponding to a respective phase voltage and coupled between the second end of each primary winding of a respective first inductor and the neutral line, wherein each auxiliary circuit comprises a respective second coupled inductor of the set of second coupled inductors, a respective first capacitor of the set of first capacitors, and the secondary winding of a respective first coupled inductor electrically coupled in series. Other aspects can include a set of second capacitors at an output of the ripple reduction circuit, each second capacitor coupled between the second end of the primary winding of a respective first inductor and the neutral line.

In another aspect, the present disclosure relates to a ripple current reduction circuit couplable to a polyphase AC voltage source without a neutral line. The circuit includes a set of first coupled inductors inductively coupled on a first common core, each first coupled inductor comprising a primary winding configured to receive at a first end a respective phase voltage from the polyphase AC voltage source, and a secondary winding. The circuit also includes a set of second coupled inductors being inductively coupled on a second common core, and a set of first capacitors, each first capacitor having a first upstream end and a first downstream end, wherein the set of first capacitors are coupled together at the first downstream end to define a first node. Additionally, a set of auxiliary circuits is included, each auxiliary circuit corresponding to a respective phase voltage and coupled between the second end of the primary winding of a respective first inductor and the first node, wherein each auxiliary circuit comprises a respective second coupled inductor of the set of second coupled inductors, a respective first capacitor of the set of first capacitors, and the secondary winding of a respective first coupled inductor electrically coupled in series. Other aspects can include a set of second capacitors at an output of the ripple reduction circuit, each second capacitor having a second upstream end and a second downstream end, wherein the set of second capacitors are coupled together at the second downstream end to define a second node, wherein each second capacitor of the set of second capacitors is coupled between the second end of the primary winding of a respective first inductor and the second node.

In another aspect, the present disclosure relates to a method of reducing a ripple current in a circuit. The method includes providing a set of first capacitors, each first capacitor each defining a respective first upstream end and a first downstream end, providing a set of second coupled inductors wound on a common core, and coupling the first downstream end of each capacitor of the set of first capacitors together to define a first node. The method can include arranging set of auxiliary circuits, each auxiliary circuit corresponding to a respective phase voltage and coupled between the second end of the primary winding of a respective first inductor and the first node, wherein each auxiliary circuit comprises a respective second coupled inductor of the set of second coupled inductors, a respective first capacitor of the set of first capacitors, and the secondary winding of a respective first coupled inductor electrically coupled in series. The method can further include coupling each primary winding of the set of first coupled inductors to an AC voltage source to receive a respective phase voltage therefrom. Other aspects can include providing a set of second capacitors each defining a respective second upstream end and a second downstream end, coupling the second downstream end of each second capacitor of the set of second capacitors together to define a second node, and coupling each second capacitor of the set of second capacitors between the second end of the primary winding of a respective first inductor and the second node.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Aspects of the disclosure can be implemented in any environment, apparatus, or method for reduction of ripple current regardless of the function performed by the apparatus or method.

As used herein, the term "upstream" refers to a direction that is opposite the fluid flow direction, and the term "downstream" refers to a direction that is in the same direction as the fluid flow. Accordingly, an "upstream" end of an element will be opposing a "downstream" end of the element. Additionally, while terms such as "voltage", "current", and "power" can be used herein, it will be evident to one skilled in the art that these terms can be interrelated when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Additionally, as used herein, "electrical connection" or "electrically coupled" can include a wired or wireless connection. The exemplary drawings are for purposes of illustration only and the dimensions, positions, order and relative sizes reflected in the drawings attached hereto can vary.

Figure 1:
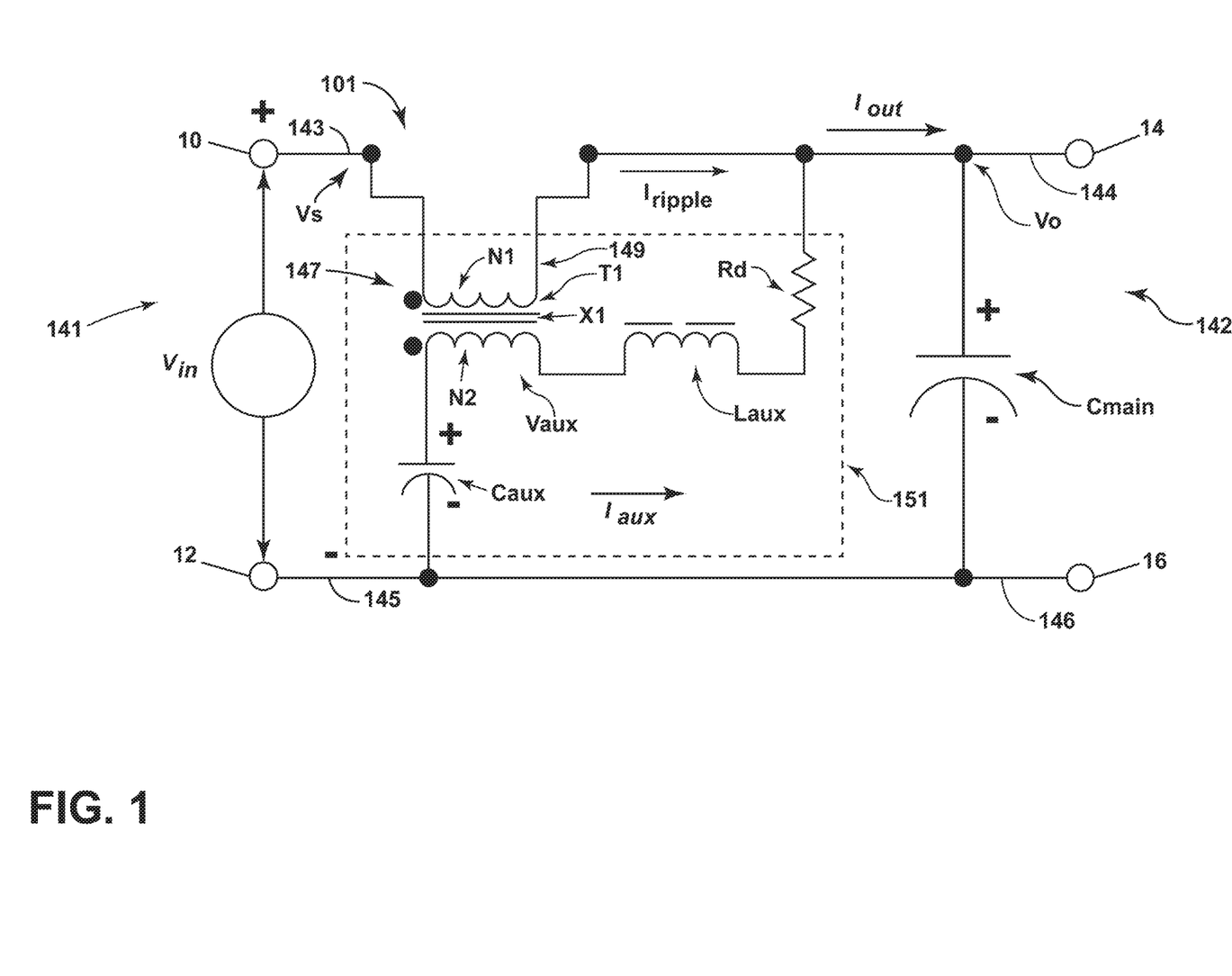
FIG. 1 depicts a schematic view of a ripple current reduction circuit in accordance with various aspects described herein.

Referring now to FIG. 1 of the drawings, a ripple current reduction circuit 101 of an aspect in accordance with the present disclosure is depicted. For ease of understanding, the ripple reduction circuit 101 is shown in FIG. 1 depicted as a simple single-phase circuit. It will be appreciated that aspects of the circuit depicted in FIG. 1 could be applied to a simple AC inverter or a DC-DC converter for example. Aspects of the invention are not so limited, and can be configured and adapted, as will be described in more detail herein, to reduce a ripple current in AC circuits having any number of phases, with and without a neutral line, without departing from the scope of the claims The ripple current reduction circuit 101 has an input side 141 comprising conductive first and second input lines 143, 145 arranged in parallel. The ripple current reduction circuit also has an output side 142 comprising conductive first and second output lines 144, 146 arranged in parallel. A first voltage source (designated Vin) having a first and a second output terminal 10, 12 defining a source voltage therebetween can be coupled in signal communication with the input side 141 of the ripple current reduction circuit 101 to provide a voltage (designated Vs) thereto. For example, the first input line 143 can be coupled to first terminal 10, and second input line 145 can be coupled to second terminal 12. The ripple current reduction circuit 101 comprises a first coupled inductor (designated T1) having a primary winding N1 magnetically coupled on a common core X1 to a secondary winding N2. That is, in an aspect, the first coupled inductor T1 can comprise two or more windings N1, N2 wrapped around a common core X1. In an aspect, the core X1 can be an iron core. In other aspects, the core X1 can comprise a stack of laminations. The auxiliary circuit 151 is arranged to cancel or diminish a ripple current (designated Iripple) through the first coupled inductor T1 as will be described in more detail herein.

The primary winding N1 can define an upstream end 147, and a downstream end 149. The primary winding N1 can be coupled at the upstream end 147 electrically in series with the first input line 143. An auxiliary circuit 151 is electrically coupled to the downstream end 149 of the primary winding N1. The auxiliary circuit 151 can include the secondary winding N2, an auxiliary capacitor Caux, an auxiliary inductor Laux, and an optional damping resistor Rd. The auxiliary circuit can be coupled between downstream end 149 of the primary winding N1 of the first coupled inductor T1, and the second input line 145. As depicted in FIG. 1, the auxiliary circuit 151 comprises the auxiliary inductor, the secondary winding N2 of the first coupled inductor, and the auxiliary capacitor Caux, electrically coupled in series. In a non-limiting aspect, the damping resistor Rdamp can be coupled to the first output line 144 downstream of the primary winding of the first coupled inductor and in series with the auxiliary inductor Laux. The primary winding N1 can be inductively coupled to the auxiliary circuit 151 via the secondary winding N2 wrapped on the common core X1.

The ripple current reduction circuit 101 can include an output or main filter capacitor Cmain at the output side 142 of the ripple reduction circuit 101 coupled in parallel with the auxiliary circuit 151. For example, in an aspect, the main capacitor Cmain can be coupled between the first and second output lines 144, 146 and can receive an output voltage (designated Vo) from the auxiliary circuit 151.

In a non-limiting aspect, the voltage source Vin can be, for example, a conventional Pulse Width Modulated (PWM) inverter (not shown) which converts a DC voltage to an AC voltage. Such an inverter would typically comprise a DC-bus capacitor across which two switching devices are connected. The switching devices can be MOSFET (Metal Oxide Silicon Field Effect Transistor), IGBT (Insulated Gate Bi-polar Transistor) or other well-known semi-conductor switches (not shown). The two switching devices are connected in series, and are interlocked or otherwise arranged to prevent a simultaneous ON state of both switches (i.e., the two switches cannot be turned on at the same time) to prevent a destructive short circuit across the capacitor. The switching devices are sequentially operated (i.e., turned on and off) such that the on-time of one will be the off-time of the other, and vice-versa. The switching devices are turned on and off at the rate of the switching frequency (or carrier) which defines the high frequency component. The on-time (or off time for the other device) can then be modulated from a minimum to a maximum within the confines of the switching frequency time by a modulating frequency (e.g., a low frequency). The center connection of the two switching devices forms one connection of the source Vin and either the center connection of a split DC-Link capacitor or the center connection of a duplicate pair of switching devices form the other connection of the source Vin. This high-frequency modulated with a low-frequency voltage can then be filtered using the aspects as will be described herein to extract the low-frequency component for the output.

In operation, the voltage source Vin can provide an input voltage such as a first voltage (designated Vs) across the first and second output terminals 10, 12. The ripple current reduction circuit 101 first input line 143 is coupled to first output terminal 10 of voltage source Vin, and is further is coupled in series to the primary winding N1 of the first coupled inductor T1 to provide the first voltage Vs as an input thereto.

It will be understood that a voltage applied to a first coil (e.g., a coupled inductor primary winding) can induce a voltage in a second coil (e.g., a coupled inductor secondary winding) where the two are linked by a magnetic path (e.g., a common core). The magnitude of the induced voltage on the secondary winding will depend on the turns or winding ratio of the first coil to the second coil. For ease of understanding and explanation, the aspect depicted in FIG. 1 is described herein as the first coupled inductor having a primary winding N1 to secondary winding N2 turns ratio of 1:1. It will be appreciated that the first coupled inductor T1 can comprise any desired winding ratio without departing from the scope of the aspects disclosed herein.

The phase relationship of two sinusoidal AC voltages (i.e., the voltage across the primary winding and the voltage induced in the secondary winding) will depend upon the relative polarity of the respective windings, and can be arranged to be either be in-phase with each other, or displaced by 180 degrees. For example, as described herein, a "first polarity" winding coupled with a second "first polarity" winding can be arranged such that the phase relationship of the two sinusoidal AC voltages at the primary and secondary voltages are in-phase with each other. In contrast, as described herein, a "first polarity" winding coupled with a second "second polarity" winding can be arranged such that the phase relationship of the two sinusoidal AC voltages at the primary and secondary voltages are out of phase, or displaced by 180 degrees, relative to each other.

A conventional dot notation is used in the accompanying Figures to indicate the relative polarity if the corresponding coupled inductors. As will be understood, the relative polarity of coupled inductor windings is based on the relative direction that their respective windings are wound around their common core. It will be understood that in keeping with the conventional dot notation (i.e. passive notation), when a current enters the dotted terminal of one coil, the voltage will be positive at the dotted end of the other corresponding coil. Thus, when a current enters the dotted terminal of a first coil winding (e.g., primary winding N1) at a dotted terminal, a current will leave the dotted terminal of the other corresponding coil winding (e.g., secondary winding N2). For example, in the aspect of FIG. 1, the dots are depicted on the same or corresponding ends of the first and second windings N1, N2 of first coupled inductor T1. Consequently, when a current (e.g., I ripple) enters the dotted end of primary winding N1, a current (e.g., I aux) will leave the dotted terminal of secondary winding N2.

It will be understood from the description of FIG. 1 that in operation, when the voltage source Vin provides an AC first voltage Vs to the ripple current reduction circuit 101, the first voltage Vs is applied to the primary winding N1 of first coupled inductor T1, and an associated main ripple current Iripple can be developed in the first coupled inductor primary winding N1. Because the first and second windings N1, N2 are inductively coupled (i.e., the primary and secondary winding N1, N2 of the first coupled inductor T1 are wrapped on the common core X1), a second voltage (designated Vaux) is induced across the secondary winding N2. Consequently, in the auxiliary circuit 151, there can be injected an opposing current, designated Iaux, into the main capacitor Cmain from the secondary winding N2 of the first coupled inductor T1. The return path of the injected current Iaux is the common of the main ripple voltage source and the main capacitor Cmain, essentially cancelling or reducing the main ripple current Iripple flowing from the primary winding N1 of first coupled inductor T1. The auxiliary circuit 151 thus provides a ripple current Iaux that is substantially an opposite or inverse of the ripple current Iripple in the primary winding N1 of the first coupled inductor T1. The ripple current Iaux developed in the auxiliary circuit 151 is combined with the ripple current Iripple from the primary winding N1 of the first coupled inductor T1 to essentially cancel or reduce the ripple current at the output. As a result, the ripple current in the filter capacitor Cmain is greatly reduced, thereby relieving stresses and losses in the capacitor Cmain, as well as increasing its filtering effectiveness.

Non-limiting aspects of the ripple current reduction circuit 101 described herein advantageously provide a voltage to a single first coupled inductor T1 magnetically coupled through a common core X1 to an auxiliary circuit 151 to reduce a ripple current Iripple at an output of the ripple current reduction circuit 101. It will be apparent that the auxiliary circuit 151 can reduce the ripple current Iripple in the filter capacitor Cmain. Moreover, the auxiliary circuit 151 of the ripple current reduction circuit 101 provides the inverse of a high frequency ripple current Iripple amplitude through the primary winding N1 of first coupled inductor T1.

For ease of understanding, the ripple current reduction circuit 101 of the present disclosure has been described herein in aspects comprising a simple single-phase circuit. However, aspects are likewise applicable to poly-phase AC circuits having any number of electrical phases. For example, some aspects can be used in 3-phase AC circuits such as Y-connected and delta-connected circuits. In other aspects, the aspects disclosed herein can be applicable to 3-phase AC circuits with a switched neutral. In still other aspects, the ripple current reduction circuit aspects disclosed herein can be operative to reduce a ripple current in a polyphase AC circuit comprising P phases, where P is any predetermined number of electrical phases, with or without a neutral.

Figure 2:
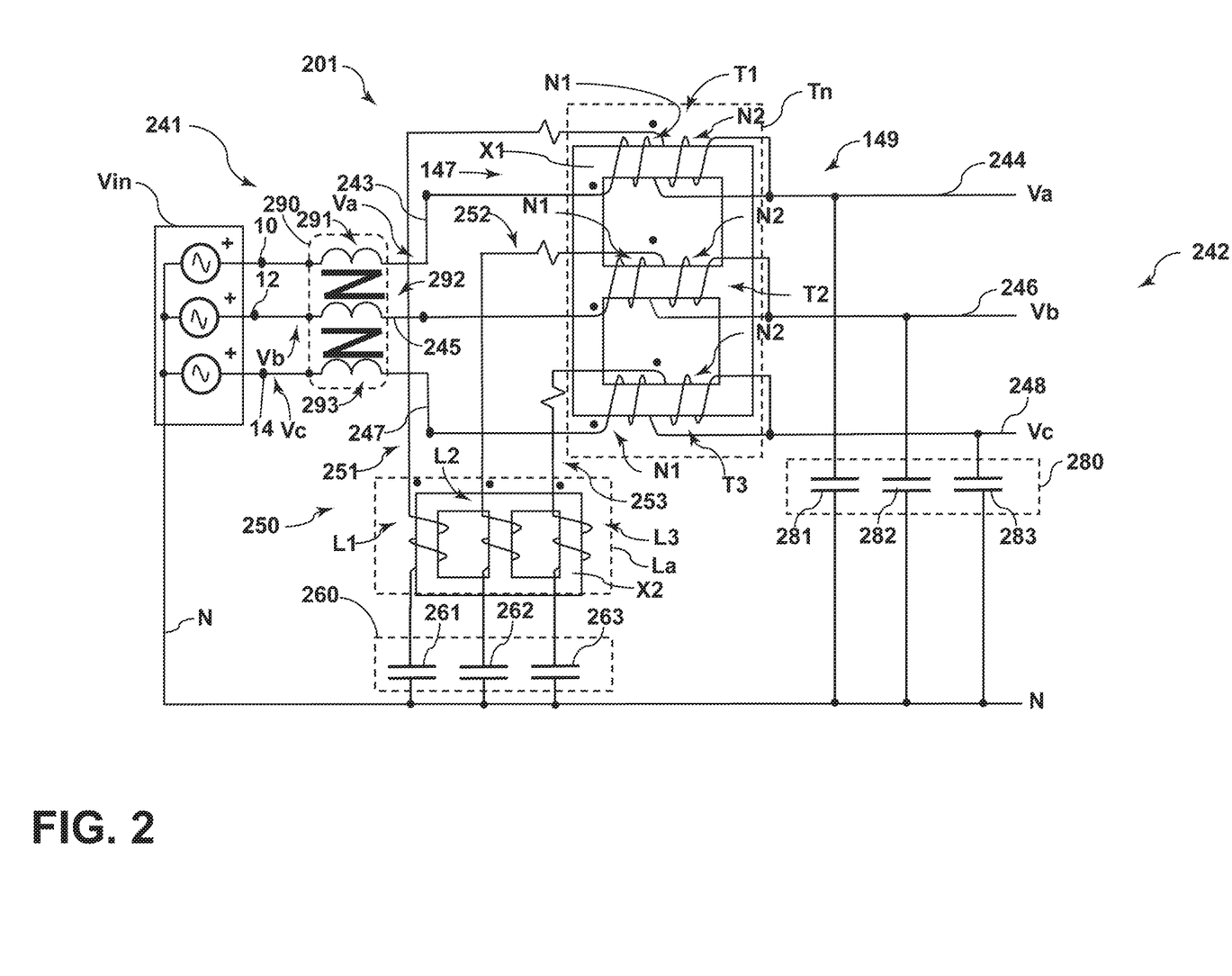
FIG. 2 depicts a ripple reduction circuit in a three-phase AC system with a neutral line in accordance with various aspects described herein.

For example, referring now to FIG. 2, an alternative aspect of the ripple reduction circuit 101 is depicted. The ripple current reduction circuit 201 illustrated in FIG. 2 is similar to the ripple current reduction circuit 101 illustrated in FIG. 1; therefore, like parts will be identified with like numerals, with it being understood that the description of the like parts of the first example ripple current reduction circuit 101 of FIG. 1 applies to the second example ripple current reduction circuit 201 of FIG. 2, unless otherwise noted.

One difference is that, instead of a single-phase circuit as depicted in FIG. 1, aspects of the disclosure included in FIG. 2 depict a ripple current reduction circuit 201 applied to a conventional three-phase, AC system comprising a three-phase first voltage source Vin having a neutral line N, for example a Y-connected system. The first voltage source Vin can comprise first, second, and third output terminals 10, 12, 14, and a neutral line N. Each output terminal 10, 12, 14 can provide a respective phase voltage (designated Va, Vb, Vc). In an aspect, the ripple current reduction circuit 201 can comprise an input side 241 having a conductive first, second, and third input lines 243, 245, 247 arranged in parallel. The first, second, and third input lines 243, 245, 247 can be coupled to a respective output terminal 10, 12, 14 of the power source Vin to receive separate respective phase voltage inputs Va, Vb, Vc therefrom. For example, the first input line 243 can be coupled to first output terminal 10, to receive voltage input Va, and second input line 245 can be coupled to second output terminal 12 to receive voltage input Vb, and the third input line 247 can be coupled to the third output terminal 14 to receive voltage input Vc. The ripple current reduction circuit 201 also has an output end 242 comprising conductive first, second, and third output lines 244, 246, 248 arranged in parallel. In an aspect, the first, second, and third output lines 244, 246, 248 can be associated with a respective phase voltage Va, Vb, Vc, respectively. For example, as depicted in FIG. 2, first output line 244 is associated with phase voltage Va, second output line 246 is associated with phase voltage Vb, and third output line 248 is associated with phase voltage Vc.

Figure 6:
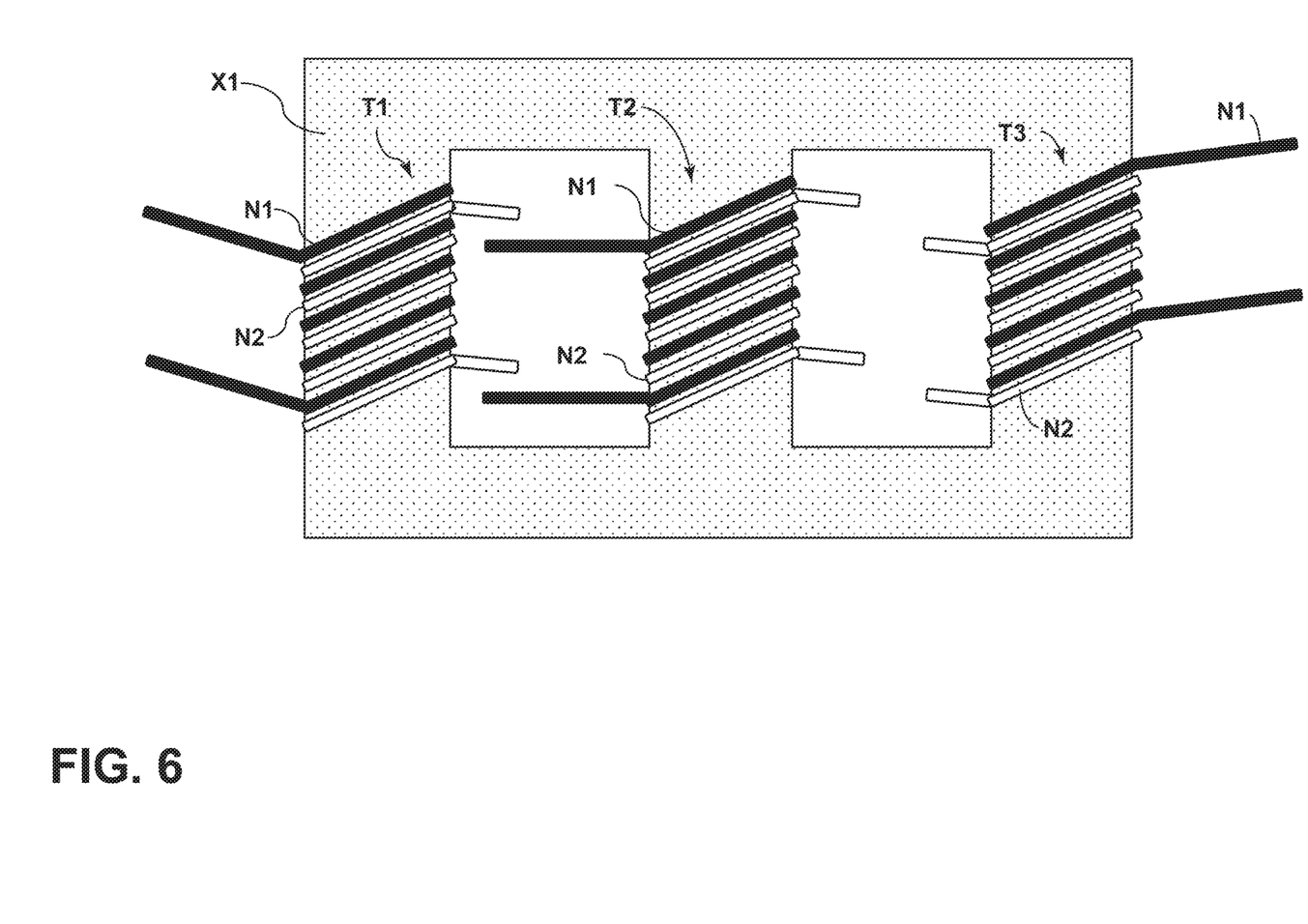
FIG. 6 depicts a set of first coupled inductors wound on a first common core in accordance with various aspects described herein.

Additionally, when applied to polyphase circuits, aspects of the ripple current reduction circuit 201 can comprise a set of first coupled inductors (designated Tn). In some aspects, the set of first coupled inductors Tn can comprise one respective first coupled inductor T1, T2, T3 per electrical phase. For example, each first coupled inductor T1, T2, T3 can be associated with a respective phase voltage Va, Vb, Vc. As depicted in the three-phase AC circuit of FIG. 2, the set of first coupled inductors Tn can comprise three inductively coupled first coupled inductors T1, T2, T3. Each first coupled inductor T1, T2, T3 of the set of first coupled inductors Tn can include a respective primary winding N1 magnetically coupled on a common first core X1 with a corresponding secondary winding N2. In an aspect, and with reference to FIG. 6 each of the first coupled inductors T1, T2, T3 can be respectively arranged as first coupled inductors T1, T2, T3 having respective primary and secondary windings N1, N2 wound on a common first core X1. In other aspects, each of the first coupled inductors T1, T2, T3 can be wound on respective common cores (not shown). That is, in an aspect, each respective first coupled inductor T1, T2, T3 can comprise two or more corresponding inductively coupled windings N1, N2 wrapped around the common core X1.

Referring again to FIG. 2, each respective primary winding N1 of the set of first coupled inductors Tn will define an upstream end 147, and a downstream end 149 of the respective primary winding N1. In an aspect, each respective primary winding N1 of the set of first coupled inductors Tn can be coupled at the upstream end 147 electrically in series with the respective input line 243, 244, 245 to receive the respective phase voltage Va, Vb, Vc therefrom. Additionally, when applied to polyphase systems and circuits, aspects of the ripple current reduction circuit 201 can further comprise a set of auxiliary circuits 250. In some aspects, the set of auxiliary circuits 250 can comprise one respective auxiliary circuit per electrical phase. For example, in the non-limiting aspect depicted in FIG. 2 the set of auxiliary circuits 250 can comprise a first, second, and third auxiliary circuit 251, 252, 253. Each auxiliary circuit 251, 252, 253 of the set of auxiliary circuits 250 corresponds to a respective phase voltage Va, Vb, Vc.

In aspects, each respective primary winding N1 of the set of first coupled inductors Tn can be electrically coupled at a respective downstream end 149 to a respective auxiliary circuit 251, 252, 253 of the set of auxiliary circuits 250. In non-limiting aspects, each respective primary winding N1 of the set of first coupled inductors Tn can be electrically coupled at the respective downstream end 149 to a respective output line 244, 246, 248. For example, the first output line 244 can be coupled to the respective downstream end 149 of the primary winding N1 of first coupled inductor T1 of the set of first coupled inductors Tn; and the second output line 246 can be coupled to the respective downstream end 149 of the primary winding N1 of the first coupled inductor T2 of the set of first coupled inductors Tn, and the third output line 248 can be coupled to the respective downstream end 149 of the primary winding N1 of the first coupled inductor T3 of the set of first coupled inductors Tn. In some aspects, each respective auxiliary circuit 251, 252, 253 of the set of auxiliary circuits 250 can be electrically coupled to the respective downstream end 149 of the primary winding N1 of a respective first coupled inductor T1, T2, T3 of the set of first coupled inductors Tn.

In non-limiting aspects, each auxiliary circuit 251, 252, 253 of the set of auxiliary circuits 250 can each be coupled between the downstream end 149 of each primary winding N1 of a respective first inductor T1, T2, T3 and the neutral line N. For example, as depicted in FIG. 2, the first auxiliary circuit 251 is coupled to the output line 244 at the downstream end of the primary winding N1 of first coupled inductor T1, the second auxiliary circuit 252 is coupled to second output line 246 at the downstream end 149 of the primary winding N1 of first coupled inductor T2, and the third auxiliary circuit 253 is coupled to third output line 248 at the downstream end 149 of the primary winding N1 of first coupled inductor T3. In non-limiting aspects, each auxiliary circuit 251, 252, 253 of the set of auxiliary circuits 250 can be coupled in parallel between the neutral line N and the respective output line 244, 246, 248 associated with a respective phase voltage Va, Vb, Vc, and. Thus, in some aspects, the neutral conductor N can serve as a common return for each auxiliary circuit 251, 252, 253.

The set of auxiliary circuits 250 can include a set of first capacitors, designated 260. In some aspects, the set of first capacitors 260 can comprise one respective first capacitor per electrical phase. For example, as depicted in the three-phase AC circuit of FIG. 2, the set of first capacitors 260 can comprise three first capacitors, 261, 262, 263. In an aspect, each first capacitor 261, 262, 262 of the set of first capacitors 260 is associated with and coupled to a respective auxiliary circuit 251, 252, 253 of the set of auxiliary circuits. For example, in the aspect depicted in FIG. 2, the first auxiliary circuit 251 includes first capacitor 261; second auxiliary circuit 252 includes first capacitor 262; and third auxiliary circuit 253 includes first capacitor 263. Consequently, in an aspect, each respective first capacitor 261, 262, 262 of the set of first capacitors 260 is associated with a respective phase voltage Va, Vb, Vc.

Figure 7:
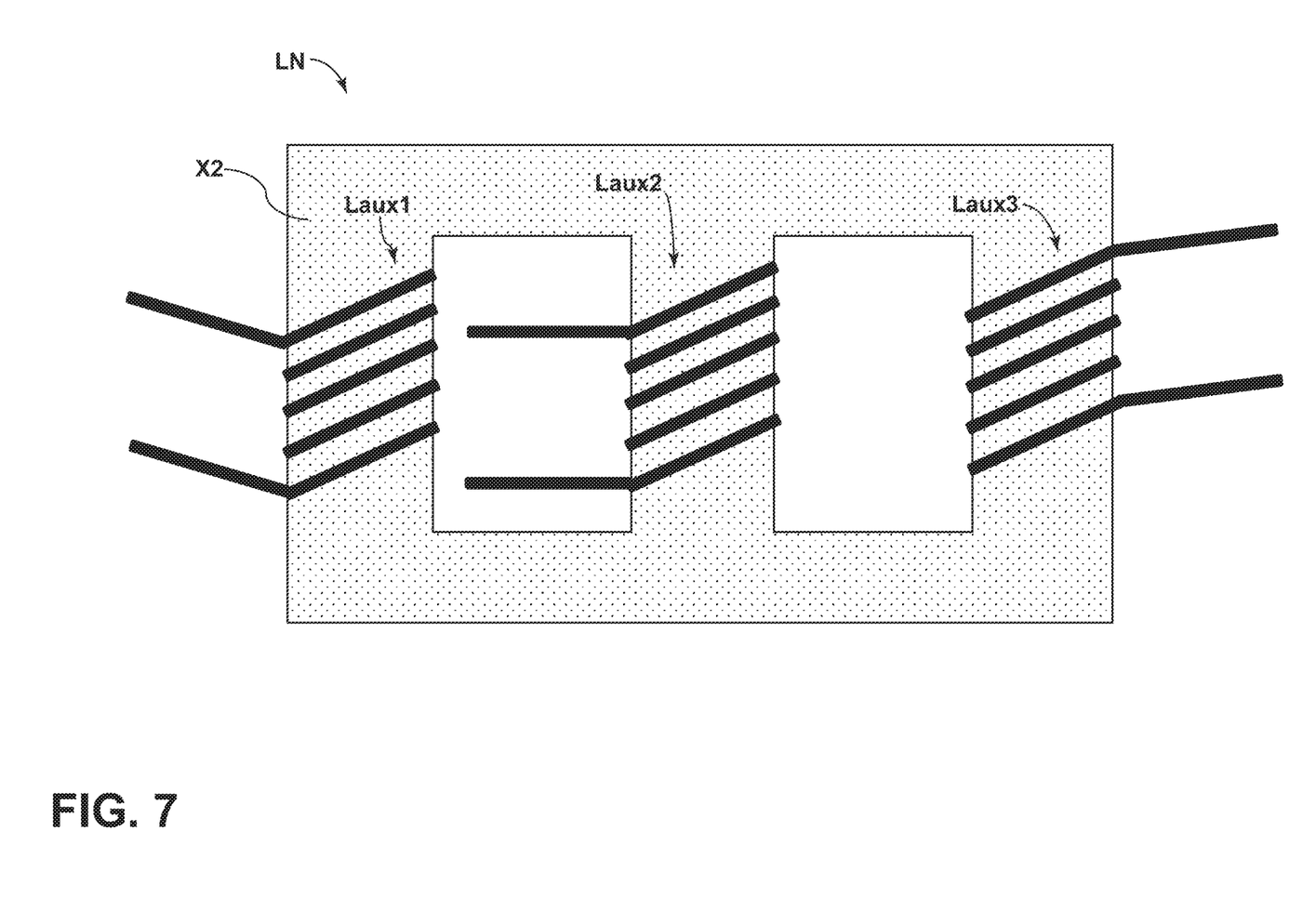
FIG. 7 depicts a set of second coupled inductors wound on a second common core in accordance with various aspects described herein.

Additionally, when applied to polyphase circuits, each auxiliary circuit 251, 252, 253 of the set of auxiliary circuits 250 can comprise a set of second coupled inductors, designated Ta. In some aspects, the set of second coupled inductors La can comprise one coupled inductor per electrical phase. For example, as depicted in the three-phase AC circuit of FIG. 2, the set of second coupled inductors La can comprise three coupled inductors, designated L1, L2, L3. With reference to FIG. 7, in aspects, each second coupled inductor L1, L2, L3 can comprise a respective coil wound on a common second core X2. In an aspect, each second coupled inductor L1, L2, L3 of the set of second coupled inductors La is associated with and coupled to a respective auxiliary circuit 251, 252, 253 of the set of auxiliary circuits 250. For example, referring again to FIG. 2, the set of auxiliary circuits 250 includes the set of second coupled inductors La, wherein the first auxiliary circuit 251 includes second coupled inductor L1, the second auxiliary circuit 252 includes second coupled inductor L2, and the third auxiliary circuit 253 includes second coupled inductor L3. In an aspect each second coupled inductor L1, L2, L3 of the set of second coupled inductors La is associated with a respective phase voltage Va, Vb, Vc.

In aspects, each respective auxiliary circuit 251, 252, 253 of the set of auxiliary circuits 250 can further include the respective secondary winding N2 of a respective inductor T1, T2, T3 of the set of first coupled inductors Tn. For example, in the aspect depicted in FIG. 2, the first auxiliary circuit 251 includes secondary winding N2 of first coupled inductor T1, the second auxiliary circuit 252 includes secondary winding N2 of a first coupled inductor T1, and the third auxiliary circuit 253 includes secondary winding N2 of first coupled inductor T3. In an aspect, respective secondary winding N2 of a respective inductor T1, T2, T3 of the set of first coupled inductors Tn is associated with a respective phase voltage Va, Vb, Vc.

As can be seen from the above description, in non-limiting aspects, each respective auxiliary circuit 251, 252, 253 of the set of auxiliary circuits 250 can comprise a respective second coupled inductor L1, L2, L3 of the set of second coupled inductors La, a respective first capacitor 261, 262, 263 of the set of first capacitors 260, and the secondary winding N2 of a respective first coupled inductor T1, T2, T3 of the set of first coupled inductors Tn, electrically coupled in series. For example, as depicted in FIG. 2, the first auxiliary circuit 251 includes the respective first capacitor 261 of the set of first capacitors 260 electrically coupled in series with the secondary winding N2 of respective first coupled inductor T1 of the set of first coupled inductors Tn, and in series with the respective second coupled inductor L1 of the set of second coupled inductors La. Similarly, the second auxiliary circuit 252 includes the respective first capacitor 262 of the set of first capacitors 260 electrically coupled in series with the secondary winding N2 of respective first coupled inductor T2 of the set of first coupled inductors Tn, and in series with the respective second coupled inductor L2 of the set of second coupled inductors. Likewise, the third auxiliary circuit 253 includes the respective first capacitor 263 of the set of first capacitors 260 electrically coupled in series with secondary winding N2 of respective first coupled inductor T3 of the set of first coupled inductors Tn, and in series with the respective second coupled inductor L3 of the set of second coupled inductors La.

Non-limiting aspects of the ripple current reduction circuit 201 can include a set of second capacitors, 280. In an aspect, the set of second capacitors 280 is disposed at an output end 242 of the ripple current reduction circuit 201. For example, as depicted in FIG. 2, the set of second capacitors 280 can include second capacitors 281, 282, 283 each corresponding to a respective phase voltage Va, Vb, Vc of the ripple reduction circuit 101. In non-limiting aspects, each second capacitor 281, 282, 283 of the set of second capacitors 280 can be coupled between the second end of the primary winding N1 of a respective first inductor T1, T2, T3 of the set of first inductors Tn and the neutral line N. In an aspect, the first capacitors 261, 262, 263 of the set of first capacitors 260 are arranged in electrically in parallel with the second capacitors 281, 282, 283 of the set of second capacitors 280. As depicted in FIG. 2. a common return path for each respective auxiliary circuit 251, 252, 253 is thus advantageously provided.

In some aspects, an optional set of third coupled inductors 290 can be included in the ripple current reduction circuit 201. The set of third coupled inductors 290 can comprise a respective common-mode-reduction type respective third inductor 291, 292, 293 on the input side 241 of the ripple current reduction circuit 201, and electrically coupled in series with the primary winding N2 of a respective first coupled inductor T1, T2, T3 of the set of first coupled inductors Tn. In an aspect each respective third inductor 291, 292, 293 of the set of third coupled inductors 291 is associated with a respective phase voltage Va, Vb, Vc. In an aspect, each third coupled inductor 291, 292, 293 can comprise two negatively-coupled windings wrapped on a common core (not shown), to suppress electromagnetic interference (EMI) and radio frequency interference (RFI) from the power supply by passing differential currents while blocking common-mode currents.

It will thus be understood from the description of FIG. 2 that in operation, the voltage source Vin can be coupled to the ripple current reduction circuit 201, and provide a three-phase voltage Va, Vb, Vc to the ripple current reduction circuit 201. Consequently, a respective phase voltage Va, Vb, Vc can be applied to the primary winding N1 of the corresponding first coupled inductor T1, T2, T3 of the set of first coupled inductors Tn, and an associated main ripple current (not shown) can be developed in the inductor primary winding N1 of the respective first coupled inductor T1, T2, T3. Because the first and second windings N1, N2 are inductively coupled (i.e., the primary and secondary winding N1, N2 of each first coupled inductor T1, T2, T3 are wound on the common core X1), a second respective voltage (not shown) is induced across each respective secondary winding N2. Consequently, in each auxiliary circuit 251, 252, 253 of the set of auxiliary circuits, there can be injected a respective opposing current, (not shown), into the respective second capacitor 281, 282, 283 of the set of second capacitors 280, from the secondary winding N2 of the respective first coupled inductor T1, T2, T3. The return path of the respective injected opposing current is the common of the main ripple voltage source Vin and the respective second capacitor 281, 282, 283 of the set of second capacitors, essentially cancelling or reducing the main ripple current (not shown) flowing from the primary winding N1 of the respective first coupled inductor T1, T2, T3.

Each auxiliary circuit 251, 252, 253 thus provides a ripple current that is substantially an opposite or inverse of the ripple current in the primary winding N1 of the respective first coupled inductor T1, T2, T3. The ripple current developed in the respective auxiliary circuit 251, 252, 253 is combined with the ripple current from the primary winding N1 of the respective first coupled inductor T1, T2, T3 to essentially cancel or reduce the ripple current at the output. As a result, the ripple current in the respective second capacitor 281, 282, 283 of the second set of capacitors 280 is greatly reduced, thereby relieving stresses and losses therein, as well as increasing its filtering effectiveness.

Non-limiting aspects of various ripple current reduction circuits 201 described herein advantageously provide a phase voltage Va, Vb, Vc to a respective first coupled inductor T1, T2, T3 inductively coupled through a common core X1 to a respective auxiliary circuit 251, 252, 253 to reduce a ripple current at an output of the ripple current reduction circuit 201. It will be apparent that the auxiliary circuits 251, 252, 253 can reduce the ripple current in the respective second capacitor 281, 282, 283. Moreover, the respective auxiliary circuits 251, 252, 253 of the ripple current reduction circuit 201 provide the inverse of a high frequency ripple current amplitude through the primary winding N1 of the respective first coupled inductor T1, T2, T3.

It will be appreciated that while the aspect of FIG. 2 described for ease of understanding with reference to a 3-phase AC electrical system having a neutral line, aspects as disclosed herein are not so limited. In other aspects, the ripple current reduction circuit can be operative to reduce a ripple current in a polyphase AC circuit comprising P phases, where P is any predetermined number of electrical phases, with or without a neutral line N.

Figure 3:
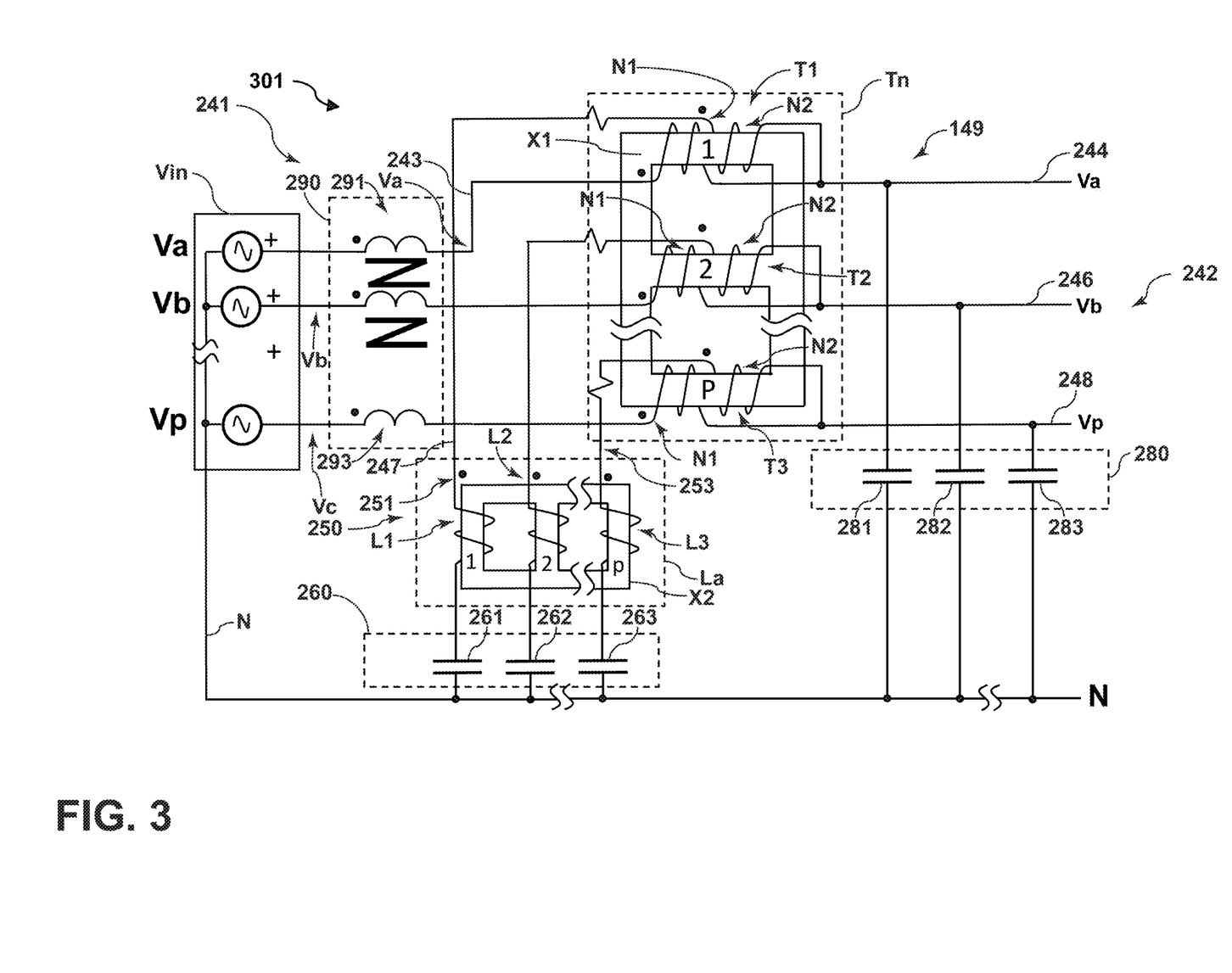
FIG. 3 depicts a generalized ripple reduction circuit in a polyphase AC system with a neutral line in accordance with various aspects described herein.

Referring now to FIG. 3, an alternative aspect of the ripple current reduction circuit 201 is depicted. The ripple current reduction circuit 301 illustrated in FIG. 3 is very similar to the ripple current reduction circuit 201 illustrated in FIG. 2; therefore, like parts will be identified with like numerals, with it being understood that the description of the like parts of the first example ripple current reduction circuit 201 of FIG. 2 applies to the second example ripple current reduction circuit 301 of FIG. 3, unless otherwise noted. FIG. 3 is a generalized depiction of an aspect of a ripple current reduction circuit 301, coupled to polyphase AC system comprising "P" phases, with a neutral, where P is any predetermined number of electrical phases. It will be understood that the teachings discussed hereinabove with respect to FIG. 2, can be applied to the generalized polyphase AC circuit as depicted in FIG. 3 by duplicating respective elements corresponding to the additional legs or phases of the AC circuit.

As will be further understood, while the aspect of the ripple current reduction circuit discussed above with respect to FIGS. 2 and 3 are operative within polyphase AC systems having a neutral line, other aspects are not so limited and can be arranged to operate in polyphase AC systems without a neutral line N.

Figure 4:
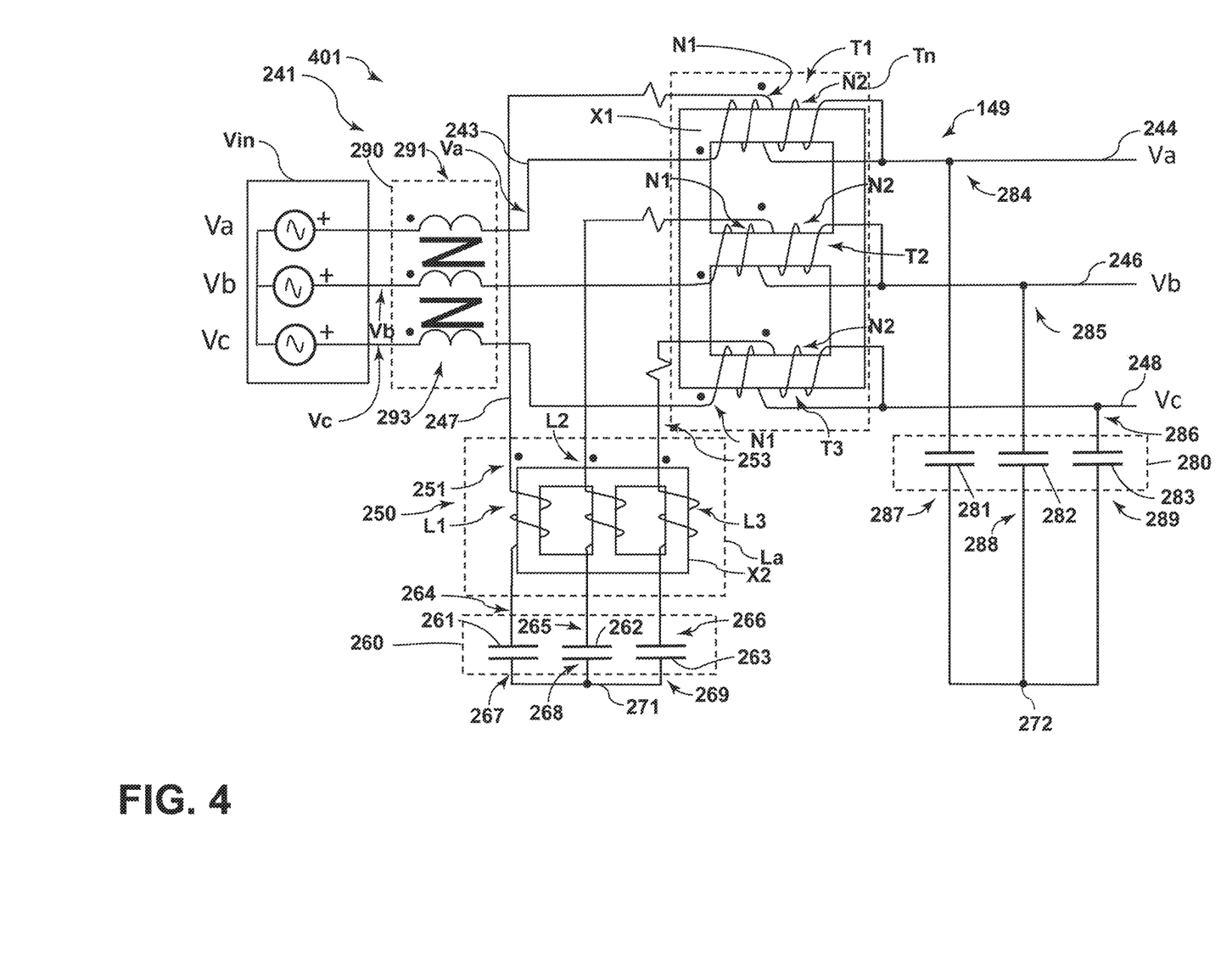
FIG. 4 depicts an AC ripple reduction circuit in a three-phase AC system without a neutral line, in accordance with various aspects described herein.

Referring now to FIG. 4, an alternative aspect of the ripple reduction circuit 201 is depicted. The ripple current reduction circuit 401 illustrated in FIG. 4 is very similar to the ripple current reduction circuit 201 illustrated in FIG. 2; therefore, like parts will be identified with like numerals, with it being understood that the description of the like parts of the first example ripple current reduction circuit 201 of FIG. 2 applies to the example ripple current reduction circuit 401 of FIG. 4, unless otherwise noted.

As depicted in FIG. 4, an aspect adapted to a 3-phase ripple reduction circuit for a 3-phase power system without a neutral line is depicted. That is, in contrast to the 3-phase circuit discussed with respect to the example aspect of FIG. 2, no neutral line is available for the return path of each of the respective auxiliary circuits 252, 252, 253. However, in this aspect (i.e., lacking a neutral line, N), the return path can advantageously be provided by providing a voltage node common to another adjacent phase.

As illustrated in FIG. 4, the set of auxiliary circuits 250 can include the set of first capacitors 260. In some aspects, the set of first capacitors 260 can comprise one respective first capacitor per electrical phase. For example, as depicted in the three-phase AC circuit of FIG. 3, the set of first capacitors 260 can comprise the three first capacitors 261, 262, 263 each associated with and coupled to a respective auxiliary circuit 251, 252, 253 of the set of auxiliary circuits 250. Each first capacitor 261, 262, 263 of the set of second capacitors 260 can define a respective first upstream end 264, 265, 266, and a respective first downstream end 267, 268, 269. Each first capacitor 261, 262, 263 of the set of first capacitors 260 can be connected at a respective upstream end 264, 265, 266 electrically in series with a respective second inductor L1, L2, L3 of the set of second coupled inductors La as part of a respective auxiliary circuit 251, 252, 253 of the set of auxiliary circuits 250. For example, in aspects, the first capacitor 261 can be coupled at the first upstream end 264 in series with the second coupled inductor L1, and the first auxiliary circuit 251 thus corresponding to phase voltage Va. the first capacitor 262 can be coupled at the first upstream end 265 in series with the second coupled inductor L2, and the second auxiliary circuit 252 thus corresponding to phase voltage Vb; and the first capacitor 263 can be coupled at the first upstream end 266 in series with the second coupled inductor L3, and the third auxiliary circuit 253 thus corresponding to phase voltage Vc.

In non-limiting aspects, each first capacitor 261, 262, 263 of the set of first capacitors 260 can be coupled together at their respective second downstream ends 267, 268, 269 to define a first common node 271. As depicted in FIG. 4. a common return path for each respective auxiliary circuit 251, 252, 253 is thus advantageously provided via the first common node 271.

As can be seen, non-limiting aspects of the ripple current reduction circuit 301 can include the second set of capacitors 280. In an aspect, the set of second capacitors 280 is disposed at an output end 242 of the ripple current reduction circuit 201. The set of second capacitors 280 can include second capacitors 281, 282, 283 each second capacitor corresponding to a respective phase voltage Va, Vb, Vc of the ripple current reduction circuit 301. Each second capacitor 281, 282, 283 of the set of second capacitors 280 can define a respective second upstream end 284, 285, 286, and a respective second downstream end 287, 288, 289. For example, as depicted in FIG. 3, the second capacitor 281 of the set of second capacitors 280 is coupled at the second upstream end 284 to the output line 244 corresponding to phase voltage Va; second capacitor 282 is coupled at the second upstream end 285 to the second output line 246, corresponding to phase voltage Vb; and second capacitor 283 is coupled at the second upstream end 286 to the third output line 248, corresponding to phase voltage Vc.

In non-limiting aspects, each second capacitor 281, 282, 283 of the set of second capacitors 280 can be coupled together at their respective second downstream ends 287, 288, 289 to define a second common node 272. As depicted in FIG. 4. a common return path for each respective auxiliary circuit 251, 252, 253 is thus advantageously provided via the second common node 272.

It will be appreciated that while the aspect of FIG. 4 is described for ease of understanding with reference to a 3-phase AC electrical system without a neutral line, aspects as disclosed herein are not so limited. In other aspects, the ripple current reduction circuit can be operative to reduce a ripple current in a polyphase AC circuit comprising P phases, without a neutral. where P is any predetermined number of electrical phases.

Figure 5:
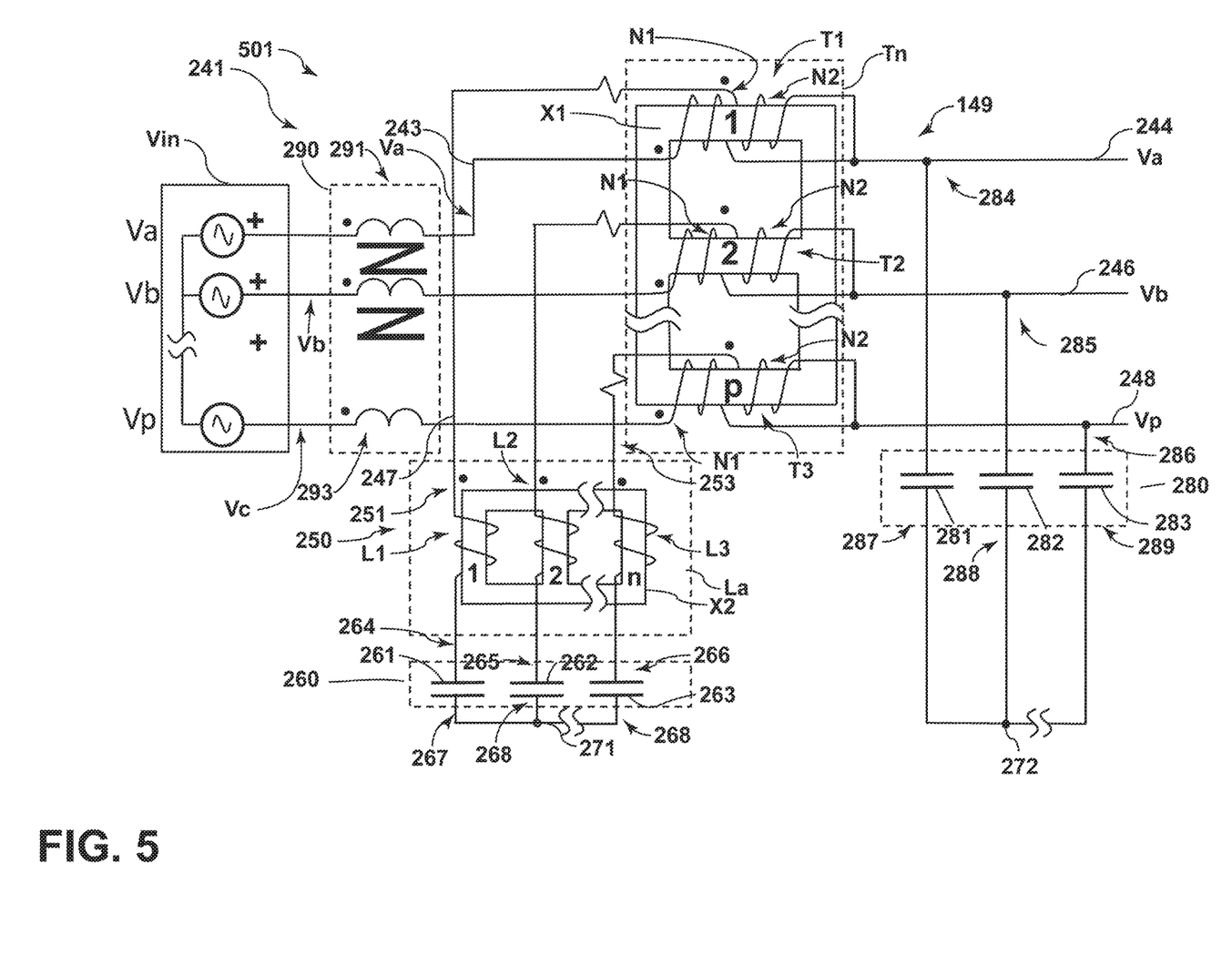
FIG. 5 depicts a generalized ripple reduction circuit in a polyphase AC system without a neutral line in accordance with various aspects described herein.

Referring now to FIG. 5, an alternative aspect of the ripple current reduction circuit 401 is depicted. The ripple current reduction circuit 501 illustrated in FIG. 5 is very similar to the ripple current reduction circuit 401 illustrated in FIG. 4; therefore, like parts will be identified with like numerals, with it being understood that the description of the like parts of the example ripple current reduction circuit 401 of FIG. 4 applies to the example ripple current reduction circuit 501 of FIG. 5, unless otherwise noted. FIG. 5 is a generalized depiction of an aspect of a ripple current reduction circuit 501, coupled to polyphase AC system comprising "P" phases, without a neutral line N, where P is any predetermined number of electrical phases. It will be understood that the teachings discussed hereinabove with respect to FIG. 4, can be applied the polyphase AC circuit as depicted in FIG. 4 by duplicating respective elements corresponding to the additional legs or phases of the AC circuit.

Figure 8:
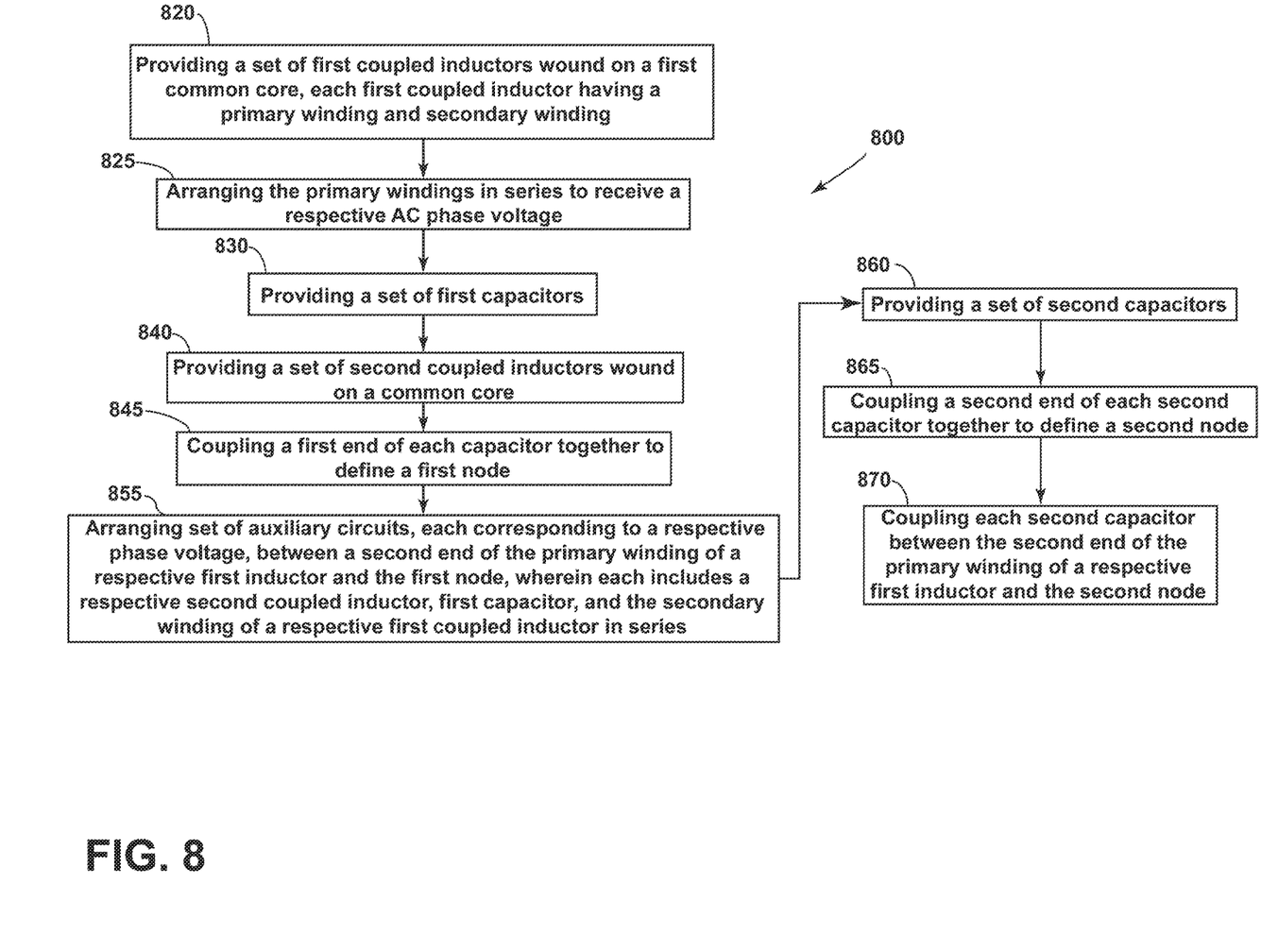
FIG. 8 depicts a method of reducing a ripple current in an AC circuit in accordance with various aspects described herein.

With reference to FIG. 8, the steps for a method 800 of reducing a ripple current in an AC circuit are illustrated. In a non-limiting aspect, the method 800 includes providing a set of first coupled inductors wound on a first common core, wherein each first coupled inductor of the set of first coupled inductors includes a respective primary winding and secondary winding, at 820, and arranging a first end of the primary winding of each first coupled inductor of the set of first coupled inductors electrically in series with a respective node of the polyphase AC voltage source to receive the respective phase voltage therefrom, at 825.

Aspects of the method 800 include providing a set of first capacitors, each first capacitor having a respective first upstream end and a first downstream end, at 830, and providing a set of second coupled inductors wound on a common core at 840. The method 800 can include coupling the first downstream end of each capacitor of the set of first capacitors together to define a first node, at 845.

The method 800 includes arranging set of auxiliary circuits, each auxiliary circuit corresponding to a respective phase voltage and coupled between the second end of the primary winding of a respective first inductor and the first node, wherein each auxiliary circuit comprises a respective second coupled inductor of the set of second coupled inductors, a respective first capacitor of the set of first capacitors, and the secondary winding of a respective first coupled inductor electrically coupled in series, at 855.

Non-limiting aspects of the method 800 can further include providing a set of second capacitors each having a respective second upstream end and a second downstream end, at 860, coupling the second downstream end of each second capacitor of the set of second capacitors together to define a second node, at 865, and coupling each second capacitor of the set of second capacitors between the second end of the primary winding of a respective first inductor and the second node, at 870. In some aspects, the first and second nodes can comprise a neutral line of the AC source.

Other aspects of method 800 can optionally include providing a set of third coupled inductors wound on a common core, and coupling a respective third inductor in series with the primary winding of a respective coupled first inductor of the set of first coupled inductors on the input side of the ripple current reduction circuit.

While the present disclosure has been described with reference to one or more exemplary aspects, it will be understood by those skilled in the art that various changes can be made and equivalents can be substituted for elements thereof without departing from the scope of the present disclosure. For example, while aspects of a ripple reduction circuit have been shown using a 3-phase AC circuit, other aspects comprising any poly-phase AC circuit are contemplated. It will be understood that the teachings hereinabove can be applied to other AC circuits having more than 3 phases by duplicating respective elements corresponding to the additional legs or phases of the AC circuit. In addition, many modifications can be made to adapt a particular situation or material to the teachings of the disclosure without departing from the scope thereof. Therefore, it is intended that the present disclosure not be limited to the particular aspect(s) disclosed as the best mode contemplated for carrying out this disclosure, but that the disclosure will include all aspects falling within the scope of the appended claims.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A ripple current reduction circuit couplable to a polyphase AC voltage source having a neutral line, the circuit comprising: a set of first coupled inductors being inductively coupled on a first common core, each first coupled inductor comprising a primary winding configured to receive at a first end a respective phase voltage from the polyphase AC voltage source, and a secondary winding; a set of second coupled inductors being inductively coupled on a second common core; a set of first capacitors; a set of auxiliary circuits, each auxiliary circuit corresponding to a respective phase voltage and coupled between the second end of each primary winding of a respective first inductor and the neutral line, wherein each auxiliary circuit comprises a respective second coupled inductor of the set of second coupled inductors, a respective first capacitor of the set of first capacitors, and the secondary winding of a respective first coupled inductor electrically coupled in series.

The ripple reduction circuit of the preceding clause further comprising a set of second capacitors at an output of the ripple reduction circuit, each second capacitor coupled between the second end of the primary winding of a respective first inductor and the neutral line.

The ripple reduction circuit of any preceding clause wherein each capacitor of the set of second capacitors is coupled to receive a respective phase voltage.

The ripple reduction circuit of any preceding clause wherein each capacitor of the set of second capacitors is coupled electrically in parallel with a respective auxiliary circuit of the set of auxiliary circuits.

The ripple reduction circuit of any preceding clause, wherein each auxiliary circuit of the set of auxiliary circuits corresponds to a respective phase voltage.

The ripple reduction circuit of any preceding clause further comprising a set of third coupled inductors, being magnetically coupled on a third common core, each coupled third inductor of the third set of coupled inductors being electrically coupled in series with the primary winding of a respective first inductor of the set of first coupled inductors at an input of the ripple reduction circuit.

The AC ripple reduction circuit of any preceding clause wherein the polyphase AC voltage source comprises a low frequency modulated high frequency AC voltage source.

The ripple reduction circuit of any preceding clause wherein the polyphase AC source is a 3-phase AC source.

A ripple current reduction circuit couplable to a polyphase AC voltage source without a neutral line, the circuit comprising: a set of first coupled inductors being inductively coupled on a first common core, each first coupled inductor comprising a primary winding configured to receive at a first end a respective phase voltage from the polyphase AC voltage source, and a secondary winding; a set of second coupled inductors being inductively coupled on a second common core; a set of first capacitors, each first capacitor having a first upstream end and a first downstream end, wherein the set of first capacitors are coupled together at the first downstream end to define a first node; a set of auxiliary circuits, each auxiliary circuit corresponding to a respective phase voltage and coupled between the second end of the primary winding of a respective first inductor and the first node, wherein each auxiliary circuit comprises a respective second coupled inductor of the set of second coupled inductors, a respective first capacitor of the set of first capacitors, and the secondary winding of a respective first coupled inductor electrically coupled in series.

The ripple reduction circuit any preceding clause further comprising a set of second capacitors at an output of the ripple reduction circuit, each second capacitor having a second upstream end and a second downstream end, wherein the set of second capacitors are coupled together at the second downstream end to define a second node, wherein each second capacitor of the set of second capacitors is coupled between the second end of the primary winding of a respective first inductor and the second node.

The ripple reduction circuit of any preceding clause wherein each capacitor of the set of second capacitors is coupled to receive a respective phase voltage.

The ripple reduction circuit of any preceding clause wherein each capacitor of the set of second capacitors is coupled electrically in parallel with a respective auxiliary circuit of the set of auxiliary circuits.

The ripple reduction circuit of any preceding clause, wherein each auxiliary circuit of the set of auxiliary circuits corresponds to a respective phase voltage.

The ripple reduction circuit of any preceding clause further comprising a set of third coupled inductors, being magnetically coupled on a third common core, each coupled third inductor of the third set of coupled inductors being electrically coupled in series with the primary winding of a respective first inductor of the set of first coupled inductors at an input of the ripple reduction circuit.

The AC ripple reduction circuit of any preceding clause wherein the polyphase AC voltage source comprises a low frequency modulated high frequency AC voltage source.

The ripple reduction circuit of any preceding clause wherein the polyphase AC source is a 3-phase AC source.

A method of reducing a ripple current in a polyphase AC circuit, comprising: providing a set of first coupled inductors wound on a first common core, each first coupled inductor having a primary winding and secondary winding; arranging each primary winding of the set of first coupled inductors to receive a respective AC phase voltage; providing a set of first capacitors, each first capacitor each defining a respective first upstream end and a first downstream end; providing a set of second coupled inductors wound on a common core; coupling the first downstream end of each capacitor of the set of first capacitors together to define a first node; arranging set of auxiliary circuits, each auxiliary circuit corresponding to a respective phase voltage and coupled between the second end of the primary winding of a respective first inductor and the first node, wherein each auxiliary circuit comprises a respective second coupled inductor of the set of second coupled inductors, a respective first capacitor of the set of first capacitors, and the secondary winding of a respective first coupled inductor electrically coupled in series; and coupling each primary winding of the set of first coupled inductors to an AC voltage source to receive a respective phase voltage therefrom.

The method of the preceding clause, further comprising: providing a set of second capacitors each defining a respective second upstream end and a second downstream end; coupling the second downstream end of each second capacitor of the set of second capacitors together to define a second node; and coupling each second capacitor of the set of second capacitors between the second end of the primary winding of a respective first inductor and the second node.

The method of any preceding clause, wherein the first and second nodes comprise a neutral line of the AC source.

The method of any preceding clause further comprising: providing a set of third coupled inductors wound on a common core; and coupling a respective third inductor in series with the primary winding of a respective coupled first inductor of the set of first coupled inductors.

What is claimed is:

1. A ripple current reduction circuit couplable to a polyphase AC voltage source having a neutral line, the circuit comprising:
    a set of first coupled inductors being inductively coupled on a first common core, each first coupled inductor comprising a respective primary winding having a first end and a second end, and configured to receive at the first end a respective phase voltage from the polyphase AC voltage source, and a secondary winding;
    a set of second coupled inductors being inductively coupled on a second common core;
    a set of first capacitors; and
    a set of auxiliary circuits, each auxiliary circuit corresponding to a respective phase voltage and coupled between the second end of each primary winding of a respective first inductor and the neutral line, wherein each auxiliary circuit comprises a respective second coupled inductor of the set of second coupled inductors, a respective first capacitor of the set of first capacitors, and the secondary winding of a respective first coupled inductor electrically coupled in series.

2. The ripple reduction circuit of claim 1, further comprising a set of second capacitors at an output of the ripple reduction circuit, each second capacitor coupled between the second end of the primary winding of a respective first inductor and the neutral line.

3. The ripple reduction circuit of claim 1, wherein each second capacitor is coupled to receive a respective phase voltage.

4. The ripple reduction circuit of claim 3, wherein each second capacitor is coupled electrically in parallel with a respective auxiliary circuit of the set of auxiliary circuits.

5. The ripple reduction circuit of claim 1, wherein each auxiliary circuit of the set of auxiliary circuits corresponds to a respective phase voltage.

6. The ripple reduction circuit of claim 1, further comprising a set of third coupled inductors, being magnetically coupled on a third common core, each third coupled inductor of the third set of coupled inductors being electrically coupled in series with the primary winding of a respective first coupled inductor of the set of first coupled inductors at an input of the ripple reduction circuit.

7. The ripple reduction circuit of claim 1, wherein the polyphase AC voltage source comprises a low frequency modulated high frequency AC voltage source.

8. The ripple reduction circuit of claim 1, wherein the polyphase AC voltage source is a 3-phase AC voltage source.

9. A ripple current reduction circuit couplable to a polyphase AC voltage source, the ripple current reduction circuit comprising:
- a set of first coupled inductors being inductively coupled on a first common core, each first coupled inductor comprising a respective primary winding having a first end and a second end, and configured to receive at the respective first end a respective phase voltage from the polyphase AC voltage source, and a secondary winding;
- a set of second coupled inductors being inductively coupled on a second common core;
- a set of first capacitors, each first capacitor having a first upstream end and a first downstream end, wherein the set of first capacitors are coupled together at the first downstream end to define a first node; and
- a set of auxiliary circuits, each auxiliary circuit corresponding to a respective phase voltage and coupled between the second end of the primary winding of a respective first coupled inductor and the first node, wherein each auxiliary circuit comprises a respective second coupled inductor of the set of second coupled inductors, a respective first capacitor of the set of first capacitors, and the secondary winding of a respective first coupled inductor electrically coupled in series.

10. The ripple reduction circuit of claim 9, further comprising a set of second capacitors at an output of the ripple reduction circuit, each second capacitor having a second upstream end and a second downstream end, wherein the set of second capacitors are coupled together at the second downstream end to define a second node, wherein each second capacitor of the set of second capacitors is coupled between the second end of the primary winding of a respective first coupled inductor and the second node.

11. The ripple reduction circuit of claim 10, wherein each capacitor of the set of second capacitors is coupled to receive a respective phase voltage.

12. The ripple reduction circuit of claim 10, wherein each capacitor of the set of second capacitors is coupled electrically in parallel with a respective auxiliary circuit of the set of auxiliary circuits.

13. The ripple reduction circuit of claim 9, wherein each auxiliary circuit of the set of auxiliary circuits corresponds to a respective phase voltage.

14. The ripple reduction circuit of claim 9, further comprising a set of third coupled inductors, being magnetically coupled on a third common core, each third coupled inductor of the set of third coupled inductors being electrically coupled in series with the primary winding of a respective first coupled inductor of the set of first coupled inductors at an input of the ripple reduction circuit.

15. The ripple reduction circuit of claim 9, wherein the polyphase AC voltage source comprises a low frequency modulated high frequency AC voltage source.

16. The ripple reduction circuit of claim 9 wherein the polyphase AC source is a 3-phase AC source.

17. A method of reducing a ripple current in a polyphase AC circuit, comprising:
- providing a set of first coupled inductors wound on a first common core, each first coupled inductor having a respective primary winding having a first end and a second end, and a secondary winding;
- arranging the first end of each primary winding of the set of first coupled inductors to receive a respective AC phase voltage;
- providing a set of first capacitors, each first capacitor each defining a respective first upstream end and a first downstream end;
- providing a set of second coupled inductors wound on a common core;
- coupling the first downstream end of each first capacitor of the set of first capacitors together to define a first node; and
- arranging a set of auxiliary circuits, each auxiliary circuit corresponding to a respective phase voltage and coupled between the second end of the primary winding of a respective first coupled inductor and the first node, wherein each auxiliary circuit comprises a respective second coupled inductor of the set of second coupled inductors, a respective first capacitor of the set of first capacitors, and the secondary winding of a respective first coupled inductor electrically coupled in series.

18. The method of claim 17, further comprising:
- providing a set of second capacitors, each second capacitor defining a respective second upstream end and a second downstream end;
- coupling the second downstream end of each second capacitor of the set of second capacitors together to define a second node; and
- coupling each second capacitor of the set of second capacitors between the second end of the primary winding of a respective first coupled inductor and the second node.

19. The method of claim 18, wherein the first and second nodes comprise a neutral line of the AC source.

20. The method of claim 17, further comprising:
- providing a set of third coupled inductors wound on a common core; and
- coupling a respective third coupled inductor in series with the primary winding of a respective coupled first inductor of the set of first coupled inductors.

\* \* \* \* \*

UNITED STATES PATENT AND TRADEMARK OFFICE
CERTIFICATE OF CORRECTION

PATENT NO. : 11,114,932 B1
APPLICATION NO. : 16/904684
DATED : September 7, 2021
INVENTOR(S) : Predrag Hadzibabic and Slobodan Gataric It is certified that error appears in the above-identified patent and that said Letters Patent is hereby corrected as shown below:

In the Claims

Column 16, Lines 48-51, should read:
--a set of auxiliary circuits, each auxiliary circuit corresponding to a respective phase voltage and coupled between the second end of each primary winding of a respective first coupled inductor and the neutral line, wherein--

Column 16, Lines 59-61, should read:
--reduction circuit, each second capacitor coupled between the second end of the primary winding of a respective first coupled inductor and the neutral line.--

Signed and Sealed this
Thirtieth Day of November, 2021

Drew Hirshfeld
*Performing the Functions and Duties of the
Under Secretary of Commerce for Intellectual Property and
Director of the United States Patent and Trademark Office*